April 21, 1964  W. L. ROSTON  3,130,105
PACKAGING APPARATUS
Filed Sept. 19, 1961  3 Sheets-Sheet 1

Wayne L. Roston
INVENTOR.

BY *Clarence A. O'Brien*
*and Harvey B. Jacobson*
Attorneys

Wayne L. Roston
INVENTOR

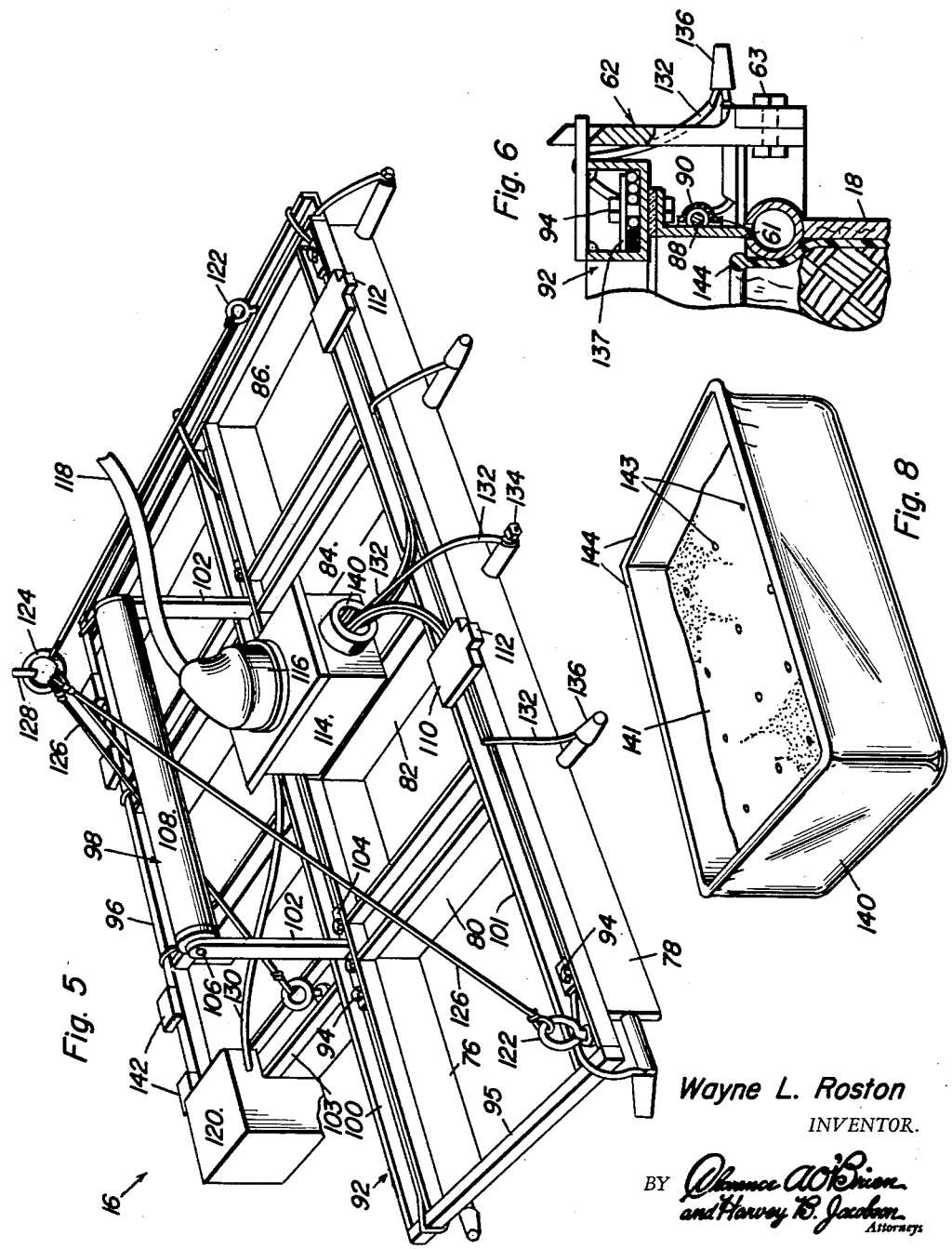

3,130,105
PACKAGING APPARATUS
Wayne L. Roston, R.D. 6, Box 198, Mansfield, Ohio
Filed Sept. 19, 1961, Ser. No. 139,124
8 Claims. (Cl. 156—515)

This invention relates to a packaging apparatus, and more particularly to a device for forming a plurality of packages containing a growing medium containing seeds or plants adapted to be grown in nurserymen's flats.

Another object of this invention is to provide a packaging apparatus for use by nurserymen which is many times cheaper to manufacture than other packaging devices for a similar purpose now on the market.

It is still another object of the invention to provide a device for making nurserymen's packages wherein the material used and required for the packages is extremely economical thereby permitting the packages to be manufactured with a minimum of cost.

More specifically, it is an object of the invention to provide a device for making nurserymen's packages out of a large sheet of polyethylene plastic wihch is formed into a plurality of separate containers when said plastic is simultaneously filled with a growing medium or seeds and a semi-automatic electric device is provided for cutting the polyethylene into separate packages and simultaneously sealing the edges thereof.

It is another object of the invention to provide a packaging device which can simultaneously form many packages.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a perspective view on an enlarged scale of the electric cutter and sealer;

FIGURE 6 is a vertical cross-sectional veiw on an enlarged scale taken substantially on the plane of line 6—6 of FIGURE 2 and showing the cutter mounted on the front of the frame;

FIGURE 8 is a perspective view on an enlarged scale showing one of the finished packages with soil and seeds therein.

Figure 1:
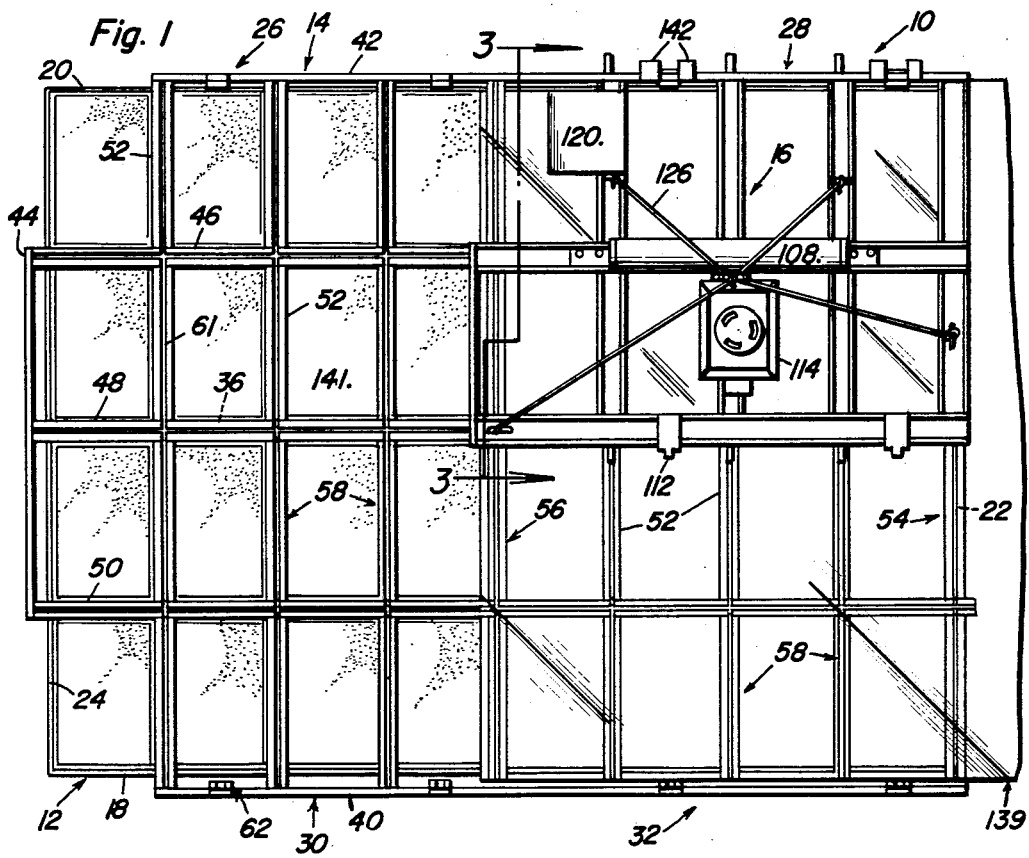
FIGURE 1 is a plan view showing the invention installed on a greenhouse flat.

As shown in FIGURE 1, the packaging apparatus 10 is used on top of a nurseryman's flat or box 12. The packaging apparatus 10 comprises a packaging frame 14 and an electric cutter 16.

Figure 2:
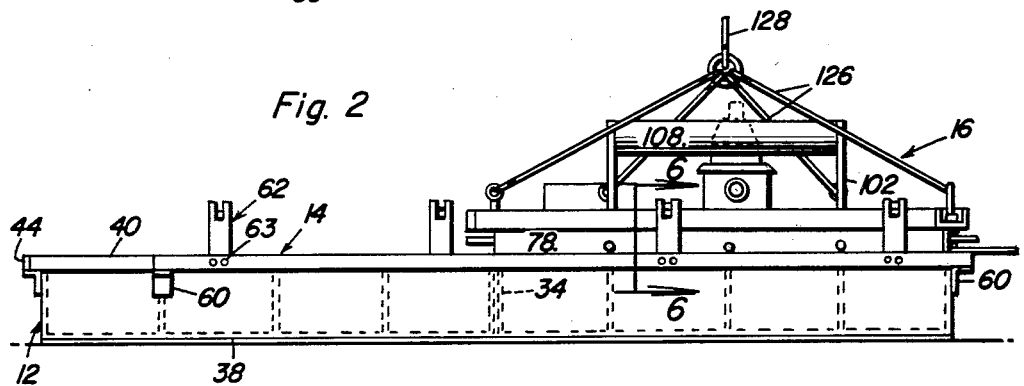
FIGURE 2 is a front elevational view of the device shown in FIGURE 1.

As shown in FIGURE 2, the packaging frame 14 rests upon the nurseryman's flat 12, while the electric cutter 16 is supported upon the packaging frame.

As shown in FIGURE 1, the nurseryman's flat 12 is of rectangular shape, and enclosed by a front wail 18, a rear wall 20, a right side wall 22, and a left side wall 24. The flat 12 is divided into four rectangular boxes 26, 28, 30 and 32 by a central partition 34 which extends from the center of the front wall 18 to the center of the rear wall 20, and a laterally extending partition 36 which extends from the center of side wall 24 to the center of the side wall 22 and is parallel to the front wall 18. The bottom of the greenhouse flat 12 is sealed by a floor structure 38.

Figure 3:
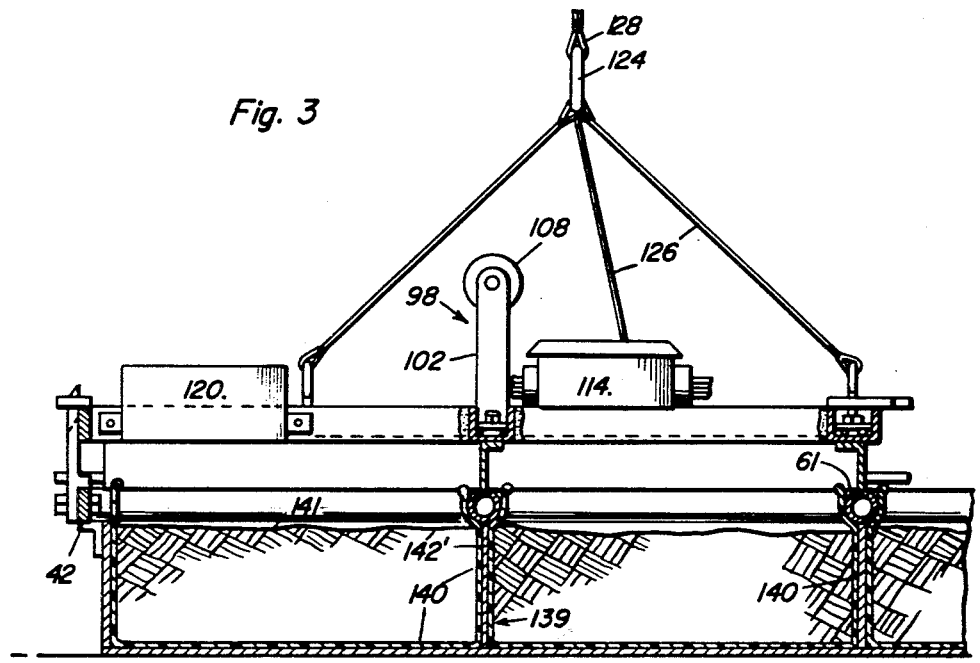
FIGURE 3 is a vertical cross-sectional view slightly enlarged and taken substantially on the plane of line 3—3 in FIGURE 1.

The packaging frame 14 is supported upon the upper surface of the nurseryman's flat 12 and is of substantially the same rectangular shape, but slightly larger in size. While the flat 12 is normally composed of wood, the frame 14 is composed of metallic rods and tubes welded together. The frame 14 comprises a front rod 40, a rear rod 42 parallel to the front rod and a left end rod 44, all the rods preferably being rectangular in cross-section as illustrated in FIGURE 3. The space or area between the front rod 40 and rear rod 42 is divided into four equal spaces by the three laterally extending pipes 46, 48 and 50 which are parallel to the front and rear rods and whose left ends are welded to the side rod 44. Each of the four laterally extending spaces is divided into eight rectangular spaces of equal size and shape by a plurality of relatively short pipe pieces 52. There are thirty-four pipe pieces 52 which are arranged in eight parallel rows so as to form a side pipe 54, a central rearwardly extending pipe 56 and a plurality of intermediate pipes 58. All of the pipes and pipe pieces are annular in cross-section and have radially and longitudinally extending slits 61 in their upper surfaces, the slits all intersecting where they cross so as to also form a plurality of rectangles of equal size and shape. However, some of the rectangles formed partially by the bars 40, 42 and 44 are slightly larger than the other rectangles. As shown in FIGURE 1, the central laterally extending pipe 48 rests upon the upper surface of the partition 36 and the central rearwardly extending pipe 56 rests upon the partition 34.

To insure that the packaging frame 14 is properly aligned with the flat 12, a plurality of angle members 60 are secured to the undersides of the rods 40, 42 and 44 and the side pipe 54. The downwardly extending legs of the angle members are guided by the outer surfaces of the walls of the flat 12.

Figure 4:
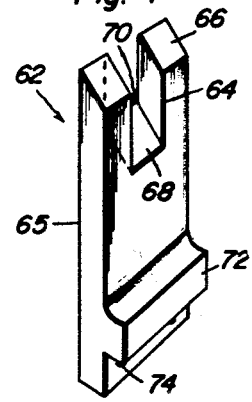
FIGURE 4 is a perspective view on an enlarged scale of a detail.

A plurality of guide yokes 62 are secured by rivets or bolts 63 to the front and rear rods 40 and 42. As shown more clealry in FIGURE 4, each of the guide yokes comprises a generally rectangular plate having a rectangular upper central groove 64 formed therein and a tapered upper surface 66. The bottom of the recess 64 is also sloped or tapered as shown at 68, and this surface is generally parallel to the surface 66. The surface 68 intersects the outer surface of the plate so as to form a relatively sharp or knife edge 70. The plate 65 of the yoke has a rectangular flange 72 projecting forwardly from its inner surface for seating upon the upper surfaces of the rods 40 and 42. The lower portion of the plate 65 has spaced bores 74 therein for receiving fastener members 63.

As shown in FIGURE 1, partitions 34 and 36 divide the flat 12 into four equal boxes, and the electric cutter 16 is shown mounted on the upper right box. The cutter 16 comprises two parallel laterally extending cutters 76 and 78 and four rearwardly extending cutters 80, 82, 84 and 86. The laterally and rearwardly extending cutters lie in the same horizontal plane and may be notched where they intersect, or made in separate pieces and welded together. The cutters are both spaced so as to form rectangles the same size as formed by the slots 61. As shown in FIGURE 6, each of the cutters is preferably L-shaped in cross section and has a sharp knife like lower edge. Secured to the side surface of each of the cutters is a high resistance electrical heating rod 88 which may be secured to the sides of the cutters by conventional means such as clamps 90. Clamps 90 are preferably U-shaped in cross-section and the end flanges thereof are secured to the cutters by screws, not shown. The heating rods 88 are preferably insulated from the cutters since it is preferable that the cutters are made of metal, and it is desired not to have any current flowing through the cutters. The cutters are secured to the lower surface of frame 92 which is composed of a plurality of channel members U-shaped in cross-section. The channel members are secured together so as to form a frame which is the same shape in plan as the arrangement of the cutters, and the U-shaped channel members are directly above the cutters and are secured thereto by bolts 94. The ends of some of the channel members of the frame are connected together by a side rod 95 and a rear rod 96.

A handle assembly 98 is secured to channel member 100 at the center of the cutter frame and comprises two parallel upstanding legs 102 welded at their lower ends to horizontal plates 104 which have apertures therein for receiving the bolts 94. The upper ends of the legs are connected by a rod 106 which extends through a central longitudinal bore in a rotatable cylindrical handle member 108.

Horizontal plates 110 are secured to the upper surface of the laterally extending frame member 101, and these plates have outwardly projecting lugs 112 for projecting into the slots 64 of guide yokes 62.

A control and switch box 114 is also mounted to the central portion of the frame 92 and has a female socket in its upper surface for receiving the prongs of a male plug member 116 which is connected to a power source by means of a cable 118. A thermostatic control switch assembly 120 is mounted on the rear end of the rearwardly extending channel member 103.

Eyelets 122 are bolted to the edges of the frame assembly and connected to a central lifting ring 124 by means of cables 126. The ring 124 is connected to a lifting device, preferably power operated, by means of a hook 128.

Figure 7:
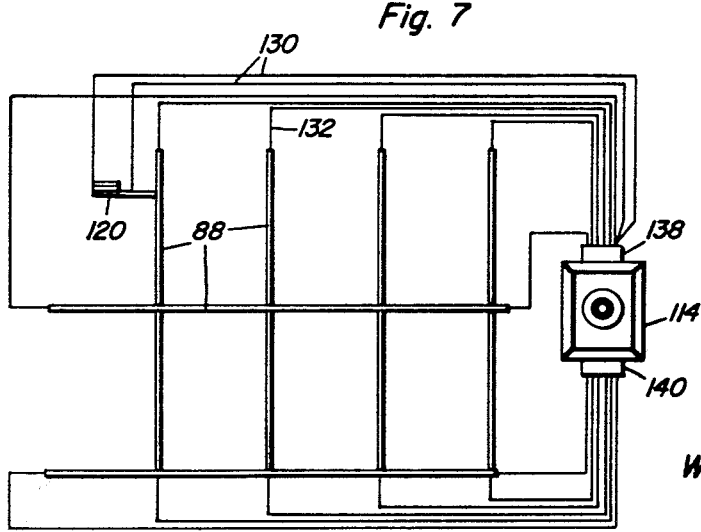
FIGURE 7 is a diagrammatic view of the electric circuit for the cutting elements.

As shown in FIGURE 7, the ends of each of the heating rods 88 are connected to the junction box 114 by a separate line or conductor. Thermostat assembly 120 is adjacent one of the heating rods and is connected in series with the main power inlet to the junction box by means of a double conductor wire 130. Thus it is apparent that when the heating rods become too hot, the thermostat 120 opens the circuit and thereby cuts off the supply of current to the heating rods. When the rods cool to a predetermined level, the thermostat again closes the circuit for supplying electricity to the rods. As shown in FIGURES 5, 6 and 7, the wires or conductors 132 which lead from the junction box to the ends of the heating rods, are connected to the ends of the rods by means of nuts 134 threaded on the ends of the rods and enclosed by conical insulating caps 136. The conductors 132 enter the junction box by means of flanged openings 138 and 140. The conductors then enter the frame channel members and are retained therein by means of rectangular retaining plates 137 which are held in position by the bolts 94.

In using the invention, the packaging frame 14 is placed upon the top of the greenhouse flat 12 as shown in FIGURES 1 and 3. The angle members 60 retain the frame in proper alignment with the flat. A large sheet 139 of polyethylene plastic is then placed over the top of the frame 14. Preferably, the plastic being very thin and flexible, is forced by hand down in between the spaces formed by the pipes 46, 48, 50, 58, 56 and 54 until the plastic rests flat upon the upper surface of floor 38. It is to be noted that the four boxes formed by the partitions 36 and 34 each contains eight packaged chambers, and while the entire flat 12 may be filled with plastic containers formed from the sheet 139, it is preferable that at least the eight chambers in one box be filled with the plastic containers. Since the plastic sheet 139 must be forced down into the flat 12 as shown in FIGURE 3, it is apparent that the total width and length of the plastic sheet must be much greater than the summation of the widths and lengths of the total number of containers formed therefrom. Also, it is apparent that some wrinkling will occur at the upper corners of the containers 140 formed by the plastic, see FIGURE 3, especially where the plastic is bent over the top of the slotted pipes.

The containers 140 after being formed, are filled with dirt 141 or other medium suitable for plant growth. The weight of the earth 141 causes the containers 140 to be expanded into firm contact with one another and the side walls and floor of the flat.

If desired, the containers may be separated by thin vertical partitions 142' which extend directly below the slotted pipes. After the eight containers in one of the four boxes have been filled with earth, the cutter assembly 16 is then installed upon the box. This is done by gradually lowering the cutter by means of a hoisting device connected at 128 and tilting and guiding the cutters so that the lugs 112 are fitted into the appropriate slots 64 of the yoke assemblies 62. Alternatively, the yoke assemblies may be straddled by guide blocks 142 secured to the rear rod 96 of the cutter frame. Of course, whether the lugs 112 or the guide blocks 142 were used, would depend upon which box received the cutter.

After the cutter is connected to the yoke assemblies, its edge opposite the yoke assemblies is pivoted downwardly whereupon the cutter blades enter the slots 61 and the heat from the rods 88 in combination with the severing action of the cutting edges of the blades causes the polyethylene plastic covering the slots to be severed. However, before the polyethylene plastic is severed, the heat from the rods 88 causes the plastic to melt so as to form a liquid or semi-liquid which forms a semi-circular bead 144 at the severed edge of the plastic. This melting also seals the wrinkled edges of the plastic so as to prevent collapse of the plastic container when it is removed from the flat 12. Also, the bead 144 reinforces and strengthens the container 140.

It is preferable that the medium 141 be planted with vegetable or plant seeds before removal of the containers from the flat. However, if desired, the plants or seeds may be installed in the medium after the containers are removed separately from the flat. Normally, there would be twelve plants or seeds planted in each container 140 as is conventional practice. The containers would be sold by nurserymen with the plants or seeds therein. The seeds are shown at 143 in FIGURE 8.

The thermostat 120 controls the heat of the cutters so that the polyethylene will not be burned, and at the same time will be properly heated so as to form the beads on the edges of the containers 140. While the cutters are shown with having sharp edges, in some cases, it may be preferable to have the cutting edges of the cutters flat so that the severing of the plastic is done entirely by heat.

For purposes of economy, heating rods have been omitted from two edges of the electric cutter, and the frame 14 has not been made completely rectangular, however, where economy is no object, it is preferable to make the frame 14 completely rectangular and supply heating rods at all edges of the cutter 16.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A packaging apparatus for nurseries including a mold having one side open, a packaging frame on said mold and enclosing the opening therein, said frame being composed of hollow members connected at their ends, longitudinal slots in said hollow members on the sides thereof opposite said mold, cutter means adjacent said frame, said cutter means including blade means of such size and shape as to extend into said longitudinal slots so as to sever a plastic material in said mold and extending over said slots, and heating means on said blade means for heating same for melting said plastic and sealing the severed edges thereof.

2. An apparatus as defined in claim 1 wherein said blade means comprise blades having knife like edges for cutting said plastic.

3. An apparatus as defined in claim 1 wherein said heating means comprise electric heating elements on said blade means.

4. An apparatus as defined in claim 1 wherein said electric heating elements are controlled by an adjustable thermostat.

5. An apparatus as defined in claim 1 wherein said comprises a nurseryman's flat divided into four boxes of equal size.

6. An apparatus as defined in claim 5 wherein said frame is also divided into four boxes of substantially the same size as the boxes in said flat, each of the frame boxes being divided into eight rectangles of substantially the same size.

7. An apparatus as defined in claim 6 wherein the slots extend around at least the majority of said rectangles.

8. An apparatus as defined in claim 1 wherein a guide is mounted on edges of said frame, said guide having a knife edge for pivoting guide lugs projecting from said cutter.

References Cited in the file of this patent

UNITED STATES PATENTS

| | | |
|---|---|---|
| 1,497,592 | Roberts | June 10, 1924 |
| 2,037,631 | Hultin | Apr. 14, 1936 |
| 2,245,356 | Murphy | June 10, 1941 |
| 2,518,565 | Nicolle | Aug. 15, 1950 |
| 2,649,672 | Thompson | Aug. 25, 1953 |
| 2,736,065 | Wilcox | Feb. 28, 1956 |
| 3,009,851 | Madsen | Nov. 21, 1961 |